United States Patent [19]

Ayoub

[11] Patent Number: 4,603,823
[45] Date of Patent: Aug. 5, 1986

[54] AIRSPEED SENSING PRESSURE VALVE SYSTEM

[75] Inventor: Peter Ayoub, Bryn Mawr, Pa.

[73] Assignee: The United States of America as represented by the Secretary of the Navy, Washington, D.C.

[21] Appl. No.: 627,307

[22] Filed: Jul. 2, 1984

[51] Int. Cl.$^4$ ............................................. B64D 17/54
[52] U.S. Cl. ............................ 244/122 AE; 244/122 R; 244/150
[58] Field of Search ......... 244/150, 122 AE, 122 AB, 244/147, 149, 122 A, 122 AH

[56] References Cited

U.S. PATENT DOCUMENTS

| | | | |
|---|---|---|---|
| 3,191,892 | 6/1965 | Fuller et al. | 244/122 AE |
| 3,530,868 | 9/1970 | Rickards | 244/122 AE |
| 3,547,383 | 11/1968 | Carpenter | 244/150 |
| 3,862,731 | 1/1975 | McIntyre | 244/122 AE |
| 4,057,206 | 11/1977 | Duncan et al. | 244/147 |

*Primary Examiner*—Trygve M. Blix
*Assistant Examiner*—Rodney Corl
*Attorney, Agent, or Firm*—Robert F. Beers; Henry Hansen

[57] ABSTRACT

A dual redundant pitot-static sensing system for use in a system for deploying a parachute during ejection of an occupant from a disabled aircraft includes a pair of pressure-sensitive check valves to store peak dynamic airstream pressure for obviating difficulties experienced when the pitots are blocked by airborne debris.

3 Claims, 6 Drawing Figures

AIRSPEED SENSING PRESSURE VALVE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a system for deploying a parachute during ejection of an occupant from a disabled aircraft, and more particularly to a fail-safe means of sensing airspeed in such a system.

Ejection seats are often provided in high speed, high altitude aircraft for assuring that the occupant will be able to escape from the aircraft in an emergency situation. Once the seat is ejected from the aircraft, the man-seat combination continues along its trajectory in the airstream for a predetermined time after which the recovery parachute is deployed for lowering the occupant safely to the ground. However, due to the widely varying conditions within which the ejection seat system must operate, it is extremely desirable that some means be provided for automatically deploying the parachute at the earliest appropriate time.

There are two basic parameters which generally govern this appropriate time. First, the airspeed existing at the time the parachute is deployed must be within a certain limit, that limit being the one which produces opening forces which does not exceed the structural capabilities of the parachute itself and which is physiologically tolerable for the ejected crewman. Second, deployment must not occur until the ejected crewman is below a certain altitude, that altitude being one at which a human being is capable of surviving for any protracted length of time.

In the typical case, ejection seat systems employ both parameters with inputs of altitude provided by a static port and airspeed provided by a pitot to determine dynamic pressure. Some systems additionally have stabilizing devices and means to separate the occupant safely from the seat.

While these systems are excellent for ejection at reasonably safe altitudes, there is a problem of safe ejection at low altitudes during landing and takeoff and in other such low airspeed/low altitude situations. The foregoing systems will sense the low altitude, but they sometimes will not sense the proper airspeed and, as a result, cause the parachute to open only after a delay.

Various improvements, such as a zero-delay ripcord, have been added to the above systems in order to achieve greater safety in low airspeed/low altitude ejections. However, these improvements are still dependent upon accurate sensing of dynamic pressure through the use of pitots. They will not, for instance, provide for safe ejection during high airspeed/low altitude emergencies when the pitots may be blocked by airborne debris such as canopy fragments.

SUMMARY OF THE INVENTION

Accordingly, it is a general purpose and object of the present invention to provide a simple, yet effective airspeed sensor, used in a system for deploying a parachute during ejection of an occupant from a disabled aircraft, which stores peak dynamic pressure in order to selectively delay parachute deployment as a function of airspeed and altitude at ejection.

Briefly, this and other objects of the present invention are accomplished by a dual redundant pitot-static sensing system which utilizes a pair of pressure-sensitive check valves. Such a system includes a pair of mode selection devices mounted to the ejection seat, each having a static port with filtered inlet for determining aircraft altitude. A pair of pitot tubes mounted on either side of the ejection seat at a point above the occupant's head are individually connected to the respective mode selection devices through flexible tubing and a pressure sensitive check valve in order to determine and store peak dynamic pressure therein. Having, thus, both an indication of aircraft altitude and airspeed, the mode selection devices select an appropriate delay time in deploying the parachute.

Other objects, advantages and novel features of the invention will become apparent from the following detailed description of the invention when considered with the accompanying drawings wherein:

DETAILED DESCRIPTION OF THE PREFERRED EMBODIMENT

Figure 1:
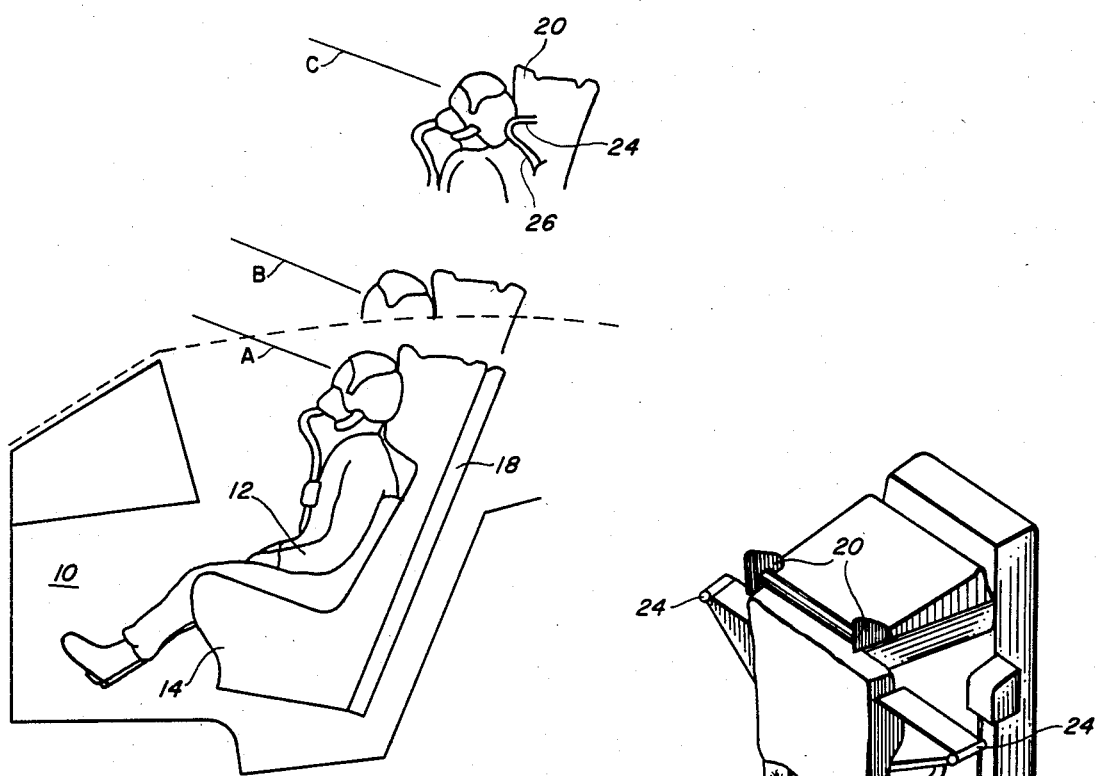
FIG. 1 is an illustration of the sequence of events occurring during ejection from an aircraft.
Figure 2:
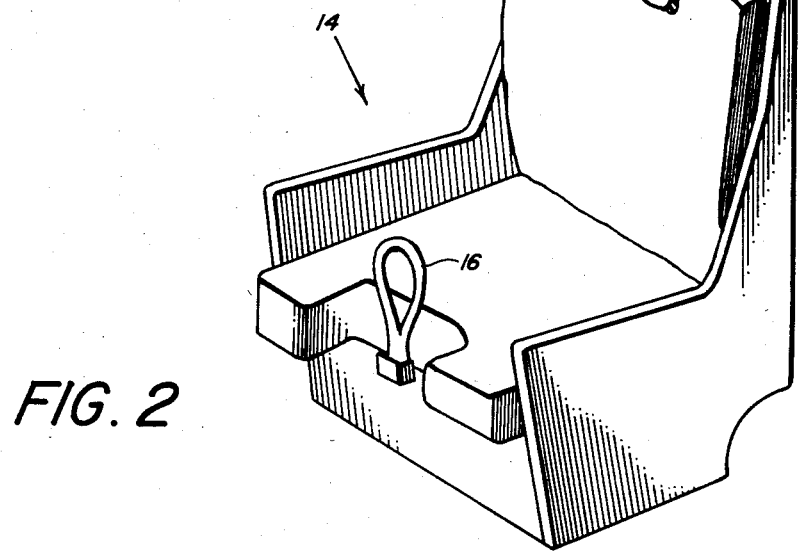
FIG. 2 is a perspective view of a typical ejection seat utilizing the present invention.

Referring now to FIGS. 1 and 2, there is shown in a cockpit 10 of a high-performance aircraft a crewman 12 occupying an ejection seat 14. At a point A during an emergency requiring ejection from the aircraft, the crewman 12 initiates the ejection sequence by pulling up an ejection control handle 16 or other similar such actuator. From that instant, the ejection seat 14 moves up a pair of rails 18 due the ballistic pressure generated by a catapult (not shown). A portion of the gases so generated is diverted to function various seat components as will be described further herein.

At some point B, approximately 0.10 to 0.11 seconds after ejection sequence initiation, a pair of bars 20, attached to and projecting above the seat 14, will break through the aircraft's canopy 22. By the time the ejection seat 14 and crewman 12 have reached a point C in the ejection sequence, approximately 0.17 to 0.19 seconds after initiation, the gases diverted from the catapult will have reached the airspeed sensing pressure valve system of the present invention.

Figure 3:
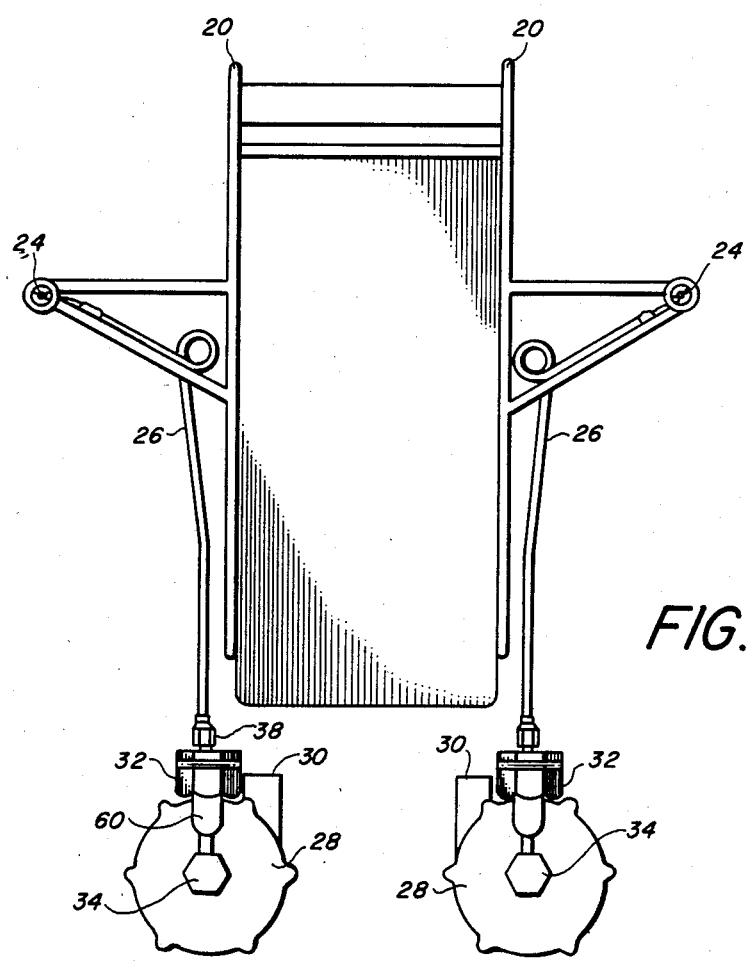
FIG. 3 is a schematic illustration of an airspeed sensing pressure valve system according to the present invention.

Shown in greater detail in FIG. 3, the airspeed sensing pressure valve system includes a pair of mode selection devices 28, each having a static port 30 with filtered inlet and pitot connection 34 by way of a pressure-sensitive check valve 32. The static ports 30 provide an input of altitude at ejection while the pitot connection 34 provides an input of freestream aerodynamic pressure. Devices 28 compare, in any conventional manner such as disclosed in U.S. Pat. No. 3,191,892 to Fuller et al, the dynamic and static pressures as to their difference which is an indication of airspeed.

Figure 4:
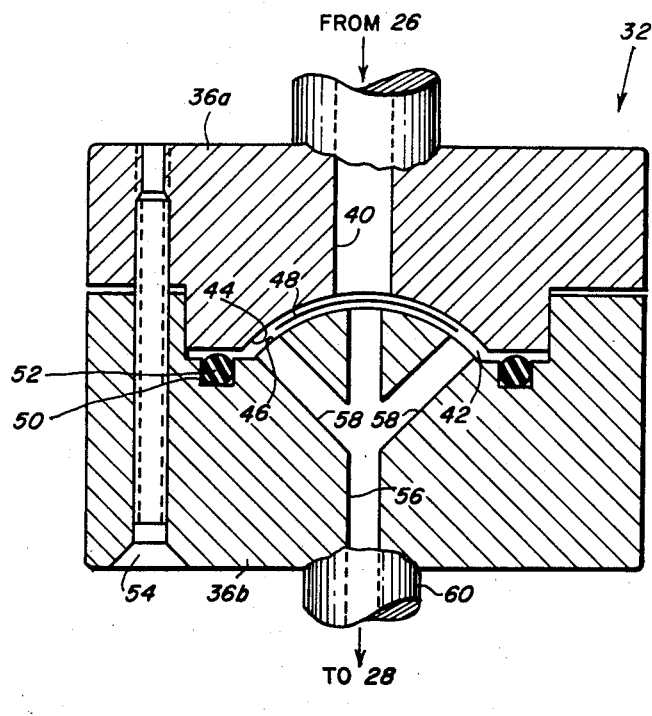
FIG. 4 is a sectional view of a pressure-sensitive check valve used in the system of FIG. 2.

By reference to FIG. 4, the operation of the present invention may be more fully described. Consisting of an inlet portion 36a and outlet portion 36b, the pressure-sensitive check valve 32 receives a dynamic pressure input from a pitot 24 through flexible tubing 26. Since the mode selection devices 28 remain inoperative unitl armed by the catapult gases acting on an arming thruster 102, it becomes necessary to receive and store the maximum dynamic pressure picked up by the pitots 24. If, for instance, airborne debris such as canopy fragments block either of the two pitots 24 after fragilization, a false, low pressure reading would be transferred to the mode selection devices 28. The pressure-sensitive check valves 32 are, therefore, configured to obviate such difficulties.

Connected to the flexible tubing 26 by a fitting 38, the inlet portion 36a of the pressure-sensitive check valve 32 includes a bore 40 through which the dynamic airstream pressure measured by the pitot 24 is transmitted to a cavity 42 formed between an interior concave-shaped, centrally disposed surface 44 of inlet portion 36a and a convex-shaped interior surface 46 of outlet portion 36b. A flexible diaphragm 48 is placed in the cavity 42 to provide one-way flow.

Outlet portion 36b is additionally formed having a channel 50 circumferentially disposed about the convex-shaped surface 46. Installed within channel 50, an O-ring 52 forms a pressure seal between inlet portion 36a and outlet portion 36b. Outlet portion 36b and inlet portion 36a are joined together by counter-sunk machine screws 54 or other suitable such means.

Extending through outlet portion 36b, a bore 56 of smaller diameter than bore 40 is branched into a plurality of radially disposed side bores 58 in order to permit passage of airstream pressure from inlet portion 36a. Another fitting 60 connects the pressure-sensitive check valve 32 to the mode selection device 28.

Figure 5:
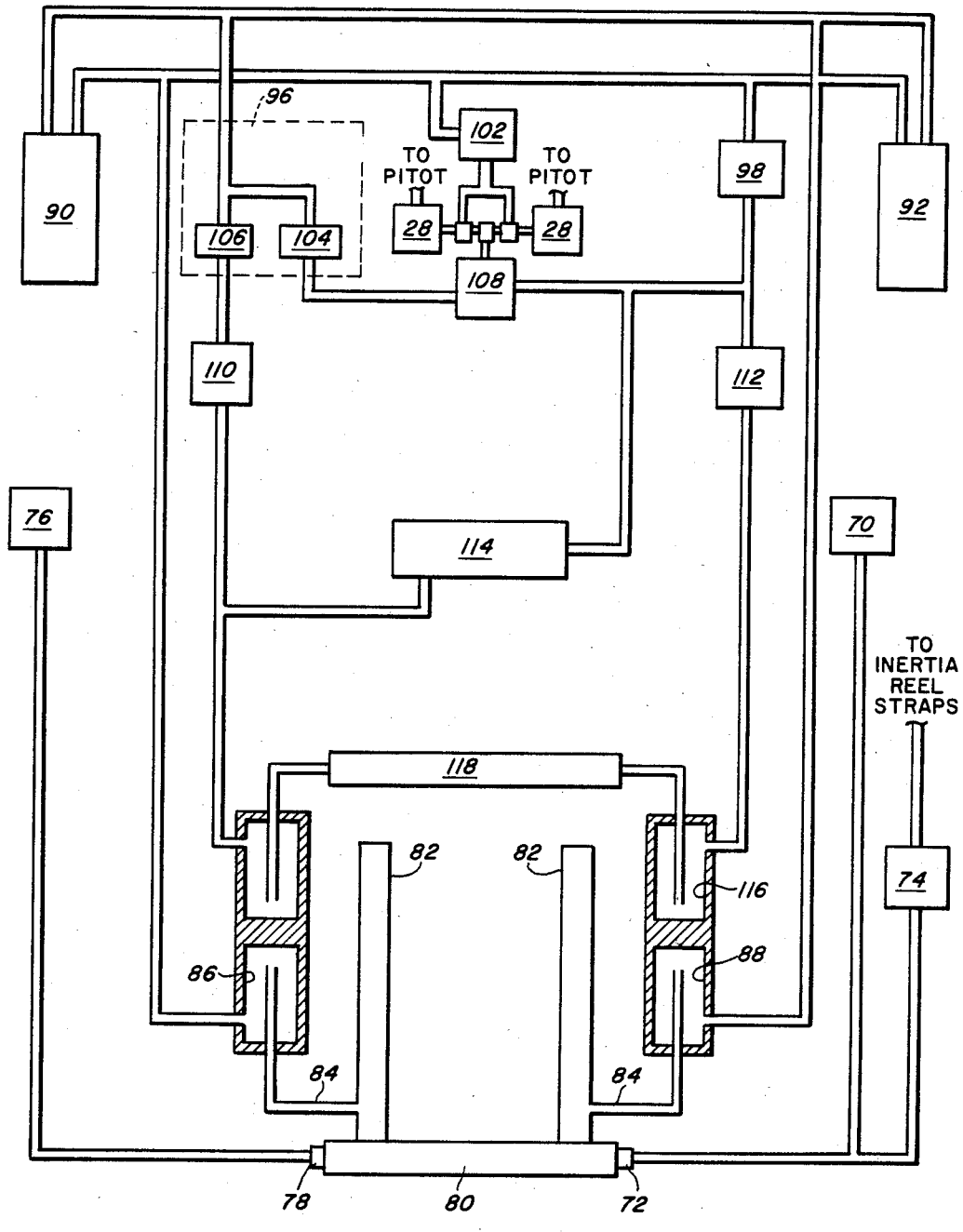
FIG. 5 is a schematic illustration of a typical parachute delay system.
Figure 6:
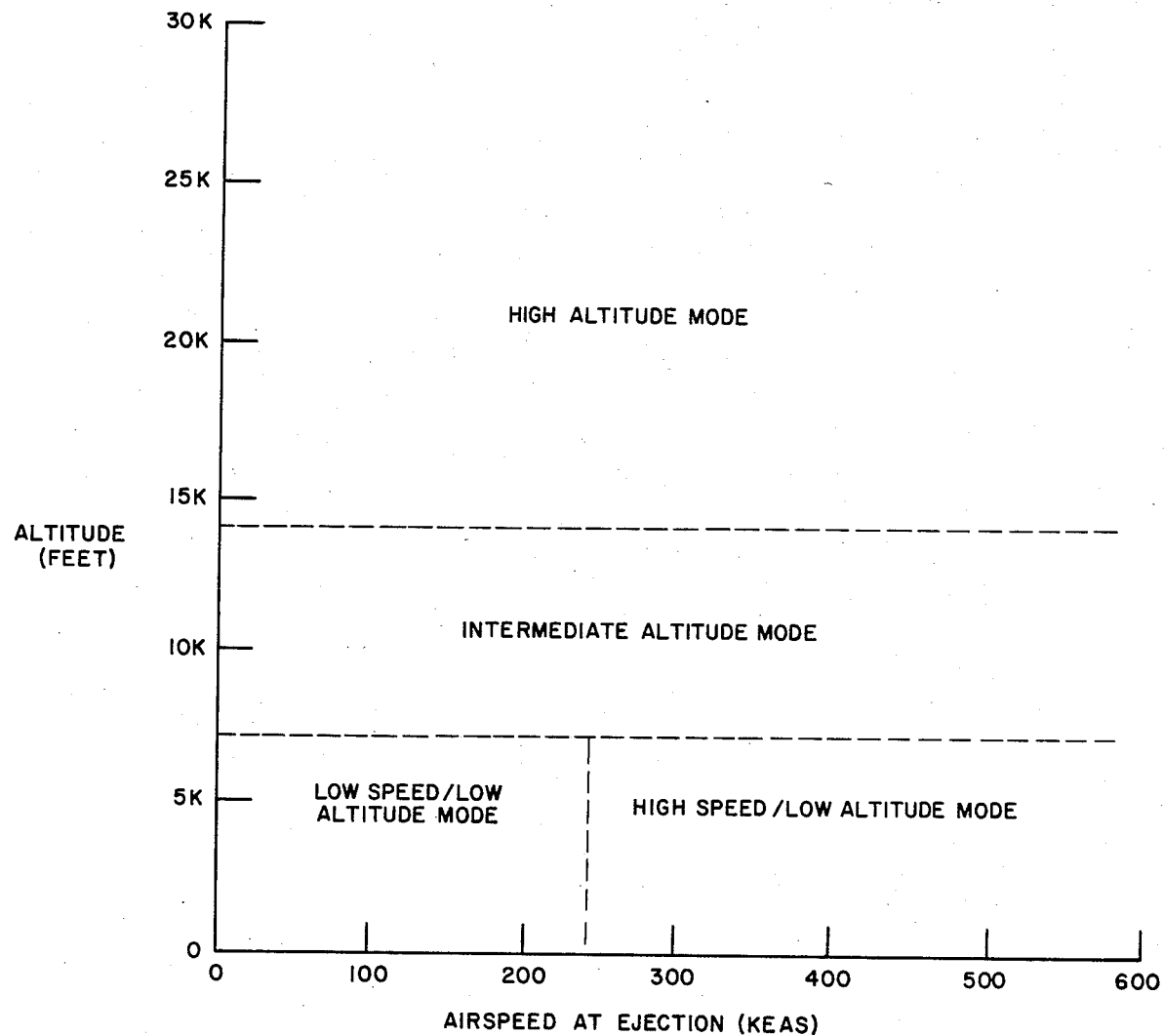
FIG. 6 is a graphic illustration of the modes of operation of the airspeed sensing pressure valve system according to the invention.

The capability of the present invention to operate under various airspeed/altitude combinations can best be explained by reference to FIG. 5 in conjunction with FIG. 6. Referring now to FIG. 5, it can be seen that pressure from a right-hand primary ejection initiator 70 is supplied to a right-hand catapult cartridge igniter 72, as well as an inertia reel gas generator 74 which provides the power to retract the inertia reel straps (not shown) and pull the occupant back securely against the seat back in an optimum position for ejection without injury. A left-hand primary ejection initiator 76 supplies gas pressure directly to a left-hand catapult cartridge igniter 78, thus providing redundant ignition of the catapult cartridge 80.

As the catapult cartridge 80 fires, gas pressure forces locking pistons (not shown) in a pair of catapult tubes 82 to disengage locking balls (not shown), and the seat and outer catapult tubes begin to move upward sliding over the inner tubes (interior of catapult tubes 82 not shown for simplicity). When the seat has traveled up approximately 38 inches (point C in FIG. 1), pressure taps 84 are exposed in both catapult tubes 82, allowing hot catapult gases to be ported to the independent left-hand and right-hand lower catapult trombones, 86 and 88 respectively. Each of these lower trombones 86 and 88 then directs gas to the left-hand 90 and right-hand 92 rocket motors to propel the seat upward to obtain aircraft extremity and terrain clearance.

The left-hand lower catapult trombone 86 also transmits pressure to activate a 3.0 second delay initiator 98, and the arming thruster 102 which, in turn, arms both seat-mounted mode selection devices 28. The right-hand lower catapult trombone 88 transmits pressure to activate the dual delay initiator 96, which then permits activation of a 0.1 second delay initiator 104 and a 1.2 second delay initiator 106. By way of the 0.1 second initiator 104 a low speed selector valve 108 is armed, while the 1.2 second initiator 106 arms a 7,000-foot aneroid actuated initiator 110.

The subsequent sequence of events depends on the airspeed and altitude of the aircraft at the time of ejection. As shown in FIG. 6, when the altitude in feet is the ordinate and ejection speed in knots equivalent air speed (KEAS) is the abscissa, there are four possible modes of operation: low speed/low altitude mode, in which ejection occurs below 7,000 feet and at less than 225 KEAS; high speed/low altitude mode, below 7,000 feet and at speeds greater than 225 KEAS; intermediate altitude mode, above 7,000 feet but below 14,000 feet at any airspeed; and high altitude mode, above 14,000 feet at any airspeed. Since the time delay initiators 94, 98, 104 and 106 have by this time already been actuated, the following events are determined by the interaction of the mode selection devices 28 in conjunction with the pressure sensitive check valves 32, the low speed selector valve 108, the 7,000-foot aneroid actuated initiator 110, and a 14,000-foot aneroid actuated initiated 112.

In the low speed/low altitude mode it is crucial to obtain full parachute deployment as quickly as possible. Sequencing in this mode is, therefore, controlled by the 0.1 second delay initiator 104. The gases from this initiator 104 must pass through the low speed selector valve 108, which contains an internal piston (not shown) which normally blocks the output from the 0.1 second delay initiator 104. Prevailing airspeed and altitude in this mode cause the mode selection devices 28 to reposition the low speed selector valve 108 piston, thus opening a path for the gases to immediately actuate a drogue release 114 and the 14,000-foot aneroid actuated initiator 112. Since ejection in this mode will occur below 14,000 feet, the initiator 112 fires immediately, further causing gases to flow into a right-hand upper catapult trombone 116 which ports pressure to operate a parachute opener 118.

In the high speed/low altitude mode, the crewman must be decelerated prior to parachute deployment in order to avoid excessive parachute opening loads. This requires that the output of the 0.1 second delay initiator 104 be blocked by the low speed selector valve 108. In this mode, prevailing high speed airstream conditions cause the mode selection devices 28 to maintain the low speed selector valve 108 piston in its normal blocking position. Sequencing is, thus, delayed until the 1.2 second delay initiator 106 fires. Hot gases are subsequently directed to the 7,000-foot aneroid actuated initiator 110, which actuates immediately since the ejection altitude is less than 7,000 feet. The drogue release 114 and parachute opener 118 are then pressurized in the same manner as in the low speed/low altitude mode.

It can be appreciated from the foregoing discussion of these two modes of operation for ejection altitudes below 7,000 feet that the critical decision is, in fact, made by the mode selection devices 28. When airspeeds at ejection are in excess of 225 KEAS, the mode selection devices 28 prevent the low speed selector valve 108 piston from moving, thereby blocking gases until the 1.2 second delay initiator 106 fires. If, however, the airspeed at ejection is in excess of 225 KEAS and the pitots 24 are blocked by airborne debris, a false dynamic pressure reading indicative of a much lower airspeed is fed to the mode selection devices 28. As a result, the devices 28 will reposition the low speed selector valve 108 piston and arm the 0.1 second delay initiator 104. The parachute will subsequently open before the man-seat combination can decelerate, and the resultant opening forces will be fatal to both the parachute and crewman. To this end, the pressure-sensitive check valves 32 upstream of the mode selection devices 28 permit the storage of peak dynamic pressure within the devices 28 unitl such time as is appropriate for safe parachute deployment through proper mode selection.

The remaining two modes: intermediate altitude and high altitude, permit a slight relaxation of timing since terrain clearance is not a problem and the main parachute operation requires slower velocity at pack opening. In the intermediate altitude mode, since ejection takes place above 7,000 feet, the mode selection devices 28 in conjunction with the low speed selector valve 108 again block the gases from the 0.1 second delay initiator 104. The 1.2 second delay initiator 106 fires to arm the 7,000-foot aneroid actuated initiator 110, but since ejection occurs above 7,000 feet this low-altitude initiator 110 does not fire immediately. Instead, the 3.0 second delay initiator 98 fires and directs its gases to actuate the drogue release 114 and arm the 14,000-foot aneroid actuated initiator 112. Since ejection is below 14,000 feet, this initiator 112 immediately fires and transmits pressure to the upper trombone 116, thus, operating the parachute opener 118.

Finally, primary emphasis in the high altitude mode is given to bring the man-seat combination down to a more moderate altitude before parachute deployment. Therefore, as in the intermediate altitude mode, the outputs of the 0.1 second 104 and 1.2 second 106 delay initiators are blocked by the low speed selector valve 108 and 7,000-foot aneroid actuated initiator 110 respectively. The 14,000-foot aneroid actuated initiator 112 is armed by the 3.0 second delay initiator 98, but an internal pressure-sensing mechanism (not shown) prevents firing above 14,000 feet. When the man-seat combination reaches 14,000 feet, the preset aneroid pressure-sensing mechanism fires the 14,000-foot aneroid actuated initiator 112 and the subsequent events are as in the intermediate altitude mode.

Therefore, it is now apparent that a simple, yet effective airspeed sensor, used in a system for deploying a parachute during ejection of an occupant from a disabled aircraft, is attainable wherein peak dynamic airstream pressure is received by pitots and stored by a pressure-sensitive check valve in order to selectively delay parachute deployment as a function of airspeed and altitude at ejection. Conditions such as blockage of the pitots by airborne debris are obviated by effectively storing the peak dynamic air pressure until such time that delay devices may selectively cause parachute opening.

Obviously, many modifications and variations of the present invention are possible in light of the above teachings. It is therefore to be understood that within the scope of the appended claims the invention may be practiced otherwise than as specifically described.

What is claimed is:

1. A pressure-sensitive device for selectively delaying deployment of a parachute in an ejection seat system of an aircraft having a gas powered catapult, said pressure-sensitive device comprising in combination:
   an ejectable seat frame;
   first sensing means attached to said seat frame responsive to static air pressure for determining the aircraft's altitude at the time of ejection;
   second sensing means including a pair of pitots attached to opposite sides of said seat frame responsive to dynamic airstream pressure;
   mode select means including a pair of sensors attached to opposite sides of said seat frame and connected to receive the static and dynamic pressures from said first and second sensing means, for comparing the static and dynamic pressures received and for selectively delaying the deployment of the parachute should the difference between the static and dynamic pressures fall below a predetermined value;
   arming means, connected between the catapult and said mode select means, for preventing actuation of said mode select means until such time that said second sensing means is exposed to dynamic airstream pressure; and
   storing means for storing a maximum dynamic airstream pressure, said storing means including a pair of pressure-sensitive check valves each connected between respective ones of said pitots and sensors.

2. A device according to claim 1, wherein said pair of pressure-sensitive check valves each comprise:
   an inlet portion having a centrally-disposed, concave-shaped depression with a hole bored therethrough;
   an outlet portion connected to said inlet portion, said outlet portion having a centrally-disposed, convex-shaped surface of substantially the same size as the concave-shaped depression of said inlet portion whereby a cavity is formed therebetween, said outlet portion further having a first hole bored through the center of, as well as a plurality of holes bored radially outward from the first hole to, its convex-shaped surface;
   a flexible diaphragm adapted to loosely fit in the cavity formed between said inlet and outlet portions alternately covering the hole bored through the concave-shaped depression in said inlet portion and the first hole bored through the center of the convex-shaped surface of said outlet portion; and
   a pair of fittings, individually attached to said inlet and outlet portions and respectively connected to said flexible tubing and said sensors.

3. A device according to claim 2, wherein said outlet portion further comprises:
   a channel circumferentially disposed about said convex-shaped surface; and
   an O-ring adapted to fit in said channel and provide a pressure seal for the cavity formed between said inlet and outlet portions.

* * * * *